United States Patent
Chen et al.

(10) Patent No.: US 7,808,907 B2
(45) Date of Patent: Oct. 5, 2010

(54) SCHEDULING METHOD FOR USE IN A MESH NETWORK

(75) Inventors: Jianfeng Chen, Beijing (CN); Caixia Chi, Beijing (CN)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1143 days.

(21) Appl. No.: 11/415,899

(22) Filed: May 2, 2006

(65) Prior Publication Data

US 2007/0258371 A1 Nov. 8, 2007

(51) Int. Cl.
H04L 12/26 (2006.01)

(52) U.S. Cl. .................. 370/235; 370/256; 370/395.21; 370/395.41; 370/468; 370/477; 370/230.1

(58) Field of Classification Search .................. 370/229, 370/230, 230.1, 231–235, 238, 254–256, 370/208, 277, 278, 280, 294, 310, 310.1, 370/314, 310.2, 328, 389, 395.1, 398, 395.21, 370/395.4, 431, 395.41, 458, 465, 468, 470, 370/477, 478
See application file for complete search history.

(56) References Cited

U.S. PATENT DOCUMENTS

| | | | |
|---|---|---|---|
| 6,256,507 B1 * | 7/2001 | Lemieux ..................... | 455/502 |
| 6,982,960 B2 * | 1/2006 | Lee et al. .................... | 370/254 |
| 7,295,544 B2 * | 11/2007 | Allen et al. ................. | 370/338 |
| 7,366,202 B2 * | 4/2008 | Scherzer et al. ............. | 370/480 |
| 7,440,436 B2 * | 10/2008 | Cheng et al. ................ | 370/338 |
| 7,643,469 B2 * | 1/2010 | Alicherry et al. ............ | 370/351 |
| 2003/0123425 A1 * | 7/2003 | Walton et al. ............... | 370/341 |
| 2005/0180329 A1 * | 8/2005 | Qiu et al. .................... | 370/238 |
| 2005/0245266 A1 * | 11/2005 | Viero et al. ................. | 455/450 |

OTHER PUBLICATIONS

IEEE 802.16 Working Group, Part 16: Air Interface for Fixed Broadband Wireless Access Systems, Jun. 24, 2004, IEEE Std 802.16-2004, pp. 141-151.*
IEEE Std 802.16-2004 (Revision of IEEE Std 802.16-2001), IEEE Standard for Local and metropolitan area networks Part 16: Air Interface for Fixed Broadband Wireless Access Systems dated Oct. 1, 2004, 857 pages.
Business Case Models for Fixed Broadband Wireless Access based on WiMAX Technology and the 802.16 Standard dated Oct. 10, 2004, Wimax Forum.

* cited by examiner

Primary Examiner—Pankaj Kumar
Assistant Examiner—Mark A Mais
(74) Attorney, Agent, or Firm—Carlson, Gaskey & Olds, P.C.

(57) ABSTRACT

A scheduling technique useful in a mesh network includes scheduling a selected amount of traffic in the mesh network using a linear program approach that minimizes a time for the selected amount of traffic to reach its intended destination. The linear program is subject to a plurality of constraints that insure that the selected amount of traffic will reach its intended destination within the minimized time. An example is disclosed that uses such a technique for a mesh network having a root node that is a base station for wireless communications and a plurality of child nodes that comprise subscriber stations. A disclosed example is useful for centralized scheduling in a Wimax mesh network.

17 Claims, 2 Drawing Sheets

SCHEDULING METHOD FOR USE IN A MESH NETWORK

FIELD OF THE INVENTION

This invention generally relates to communications. More particularly, this invention relates to communications in a mesh network.

DESCRIPTION OF THE RELATED ART

A variety of communication networks are known. Multiple hop wireless mesh networks are promising candidates for providing ubiquitous, high-speed wireless access to customers. Example uses for such mesh networks include broadband home networking, community and neighborhood networks or enterprise networking. The original IEEE 802.16 standard addressed applications in licensed bands in the frequency range from 10 to 66 GHz using a point-to-multipoint (PMP) mode. Subsequent amendments have extended the 802.16 air interface standard to cover non-line of sight applications in licensed and unlicensed bands in the range below 11 GHz. Amendments to the 802.16 standard have also added a mesh mode.

Compared to using a PMP mode, a mesh mode has several distinguishing characteristics. In a mesh mode, traffic can occur directly between subscriber stations. In mesh mode, traffic may be relayed by internal nodes (in uplink and downlink directions) so that bandwidth allocation may cover more than one frame time slot. The topology of a mesh network may change more dynamically compared to that in PMP mode.

Some research results have shown that throughput capacity can be increased by deploying relaying nodes. One of the biggest challenges in building a wireless mesh network, however, is how to handle scheduling schemes to achieve guaranteed performance. Scheduling schemes must address both throughput and delay, for example. Although centralized scheduling using coordinated and non-coordinated distributed scheduling are mentioned in the IEEE 802.16-2004 standard, no detailed definitions are provided.

It is not possible to simply employ PMP scheduling techniques in a mesh network. Algorithms used in PMP mode are not suitable for mesh mode because they all deal with centralized scheduling in a one hop range. Algorithms deployed in ad-hoc networks are applied in distributed networks, which lack the centralized scheduling control.

There is a need for a scheduling technique for use in mesh networks. This invention addresses that need.

SUMMARY OF THE INVENTION

An exemplary method of communicating in a mesh network having a root node and a plurality of child nodes associated with the root node includes scheduling a selected amount of traffic in the mesh network using a linear program that minimizes a time for the selected amount of traffic to reach its intended destination subject to a plurality of constraints that ensure that the selected amount of traffic will reach its intended destination within the minimized time.

One example includes constructing a routing tree through message exchanging in the mesh network. Such an arrangement is useful for centralized scheduling, for example.

In one example, the minimized time for the traffic to reach its intended destination comprises a plurality of frames within which the traffic will be transmitted between at least two of the nodes for the traffic to reach its intended destination.

One example includes a first constraint requiring that all transmissions from at least one of the plurality of child nodes to the root node will reach the root node within the minimized time. A second constraint in one example requires that all transmissions from the root node to at least one of the child nodes reach that child node within the minimized time. A third constraint in one example requires that a total amount of traffic to and from each of the nodes does not exceed a corresponding capacity of each node.

A fourth constraint in one example requires that the total uplink traffic transmitted by each of the child nodes during the minimized time is no greater than any uplink traffic received by one of the child nodes from any other of the plurality of child nodes during the minimized time and any uplink traffic originated by the one child node during the minimized time. A fifth constraint is that the root node sends no uplink traffic. Another example constraint is that the total downlink traffic at a child node is no greater than that received from a neighbor parent node. One more example constraint prevents a child node from sending any downlink traffic if it has not received any from at least one parent node.

The linear program approach of this invention provides a bandwidth allocation scheme to minimize the total scheduling period for a selected amount of traffic.

The various features and advantages of this invention will become apparent to those skilled in the art from the following detailed description. The drawings that accompany the detailed description can be briefly described as follows.

DETAILED DESCRIPTION

The following example demonstrates how an embodiment of this invention applies a linear program technique to scheduling communications in a mesh network for minimizing the amount of time required for a given amount of traffic to reach its intended destination.

Figure 1:
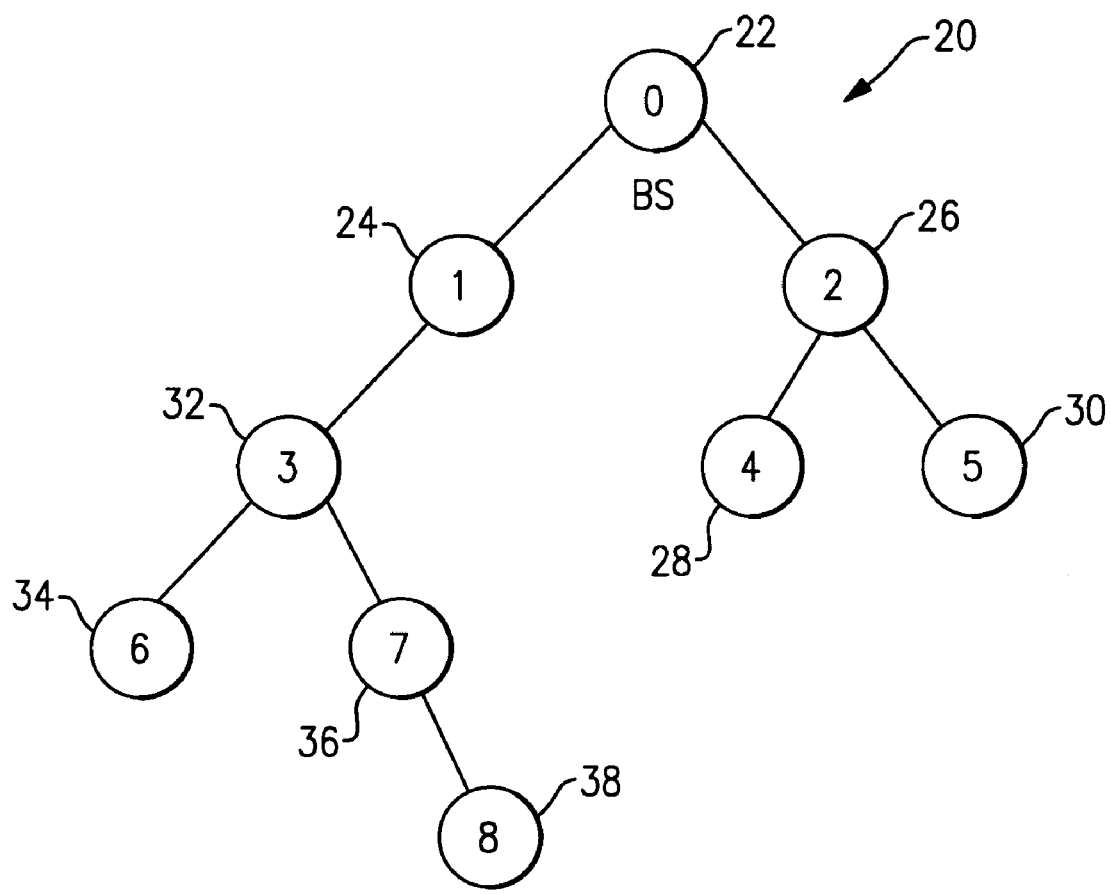
FIG. 1 schematically shows selected portions of a mesh network with which an embodiment of this invention is useful.

FIG. 1 schematically shows an example mesh network 20. In the illustration, a tree structure has been established through message exchanging. Having a tree structure facilitates centralized scheduling using an embodiment of this invention. This example includes a root node 22, which in one example is a base station used for wireless communications between a mobile station and a wireless network, for example. A plurality of child nodes 24 and 26 depend from or are associated with the root node 22 at a first hierarchical level. The child node 26 includes a plurality of child nodes 28 and 30, which are both at the same level in the hierarchical arrangement schematically shown in FIG. 1.

The child node 24 has an associated child node 32 at a "lower level" within the hierarchical structure of FIG. 1. One child node 34 depends from the child node 32 while another child node 36 depends from the child node 32 and has a dependent child node 38.

In one example, each of the child nodes 24-38 comprises a subscriber station such as a mobile station. In the example of FIG. 1, communications can occur between the child nodes along the branches of the tree structure or hierarchical structure schematically shown in the figure.

In mesh network examples where the IEEE 802.16-204 standard is used, only time division (TDD) mode is supported for such a mesh network. Additionally, in such examples the MAC layer is assumed to schedule data to multiple access (e.g., using time division multiple access) through a single carrier channel. In such examples, a frame in each link can be built once the bandwidth allocation result is determined.

For purposes of discussion, we consider an example that has several governing principles or rules. The first of these is that any node within the mesh network cannot transmit and receive at the same time. The second is that relaying data traffic received by one subscriber station cannot be transferred immediately to its neighbor in the same frame slot. This is because the subscriber station usually has performance constraints such as buffer writing and reading. A third rule is that nodes within the transmission range of an active node are blocked to avoid interference. A fourth rule is that any two nodes that are not interfering with each other can potentially transmit data packets over the physical channel simultaneously.

It is believed that interference between concurrent transmissions from neighboring nodes is one of the most significant factors that limit system throughput and scalability for wireless multi-hop networks. Directional antennae at the transmitters and receivers can minimize transmission ranges of the nodes and applying the fourth rule mentioned in the previous paragraph is useful in some examples for improving the throughput of the mesh network.

In examples where all nodes share a wireless channel and communicate on that channel, each node is assumed to be equipped with multiple directional antennas. A directional antenna, as known, can transmit or receive over a small angle (e.g., 45°) centered on the receiver or transmitter, respectively. Further, several directional antennas may be used together to cover all directions. For purposes of discussion, we assume that there is no interference at angles beyond the prescribed beam width of a directional antenna or at distances beyond 10% of the transmitter-to-receiver link length.

Directional transmissions over two different links will interfere at the two receiving access points if the access points are located within the beam of the other link. Transmissions by two or more links will interfere at the same received node even if different directional antennas at the node receive these transmissions. This assumption is justified, for instance, in the case where signals received by all antennas are combined before sending to the receiving circuitry. We also assume, for purposes of discussion, that simultaneous transmissions by the same node in different directions are not allowed.

Referring to FIG. 1, assume that the nodes 32, 36 and 38 each have a 45° transmission range and a length that is greater than the distance to the adjacent node. If the node 32 transmits to the node 36, the node 36 will experience interference if it were to simultaneously receive from the node 38. Therefore, in at least one example, such a timing of transmissions among the nodes 32, 36 and 38 will be avoided. On the other hand, the node 32 can transmit to the node 34 simultaneously with the node 38 transmitting to the node 36. No interference would occur in this scenario because the transmission ranges of the transmitting nodes (e.g., 32 and 38 in this instance) will not overlap.

Figure 2:
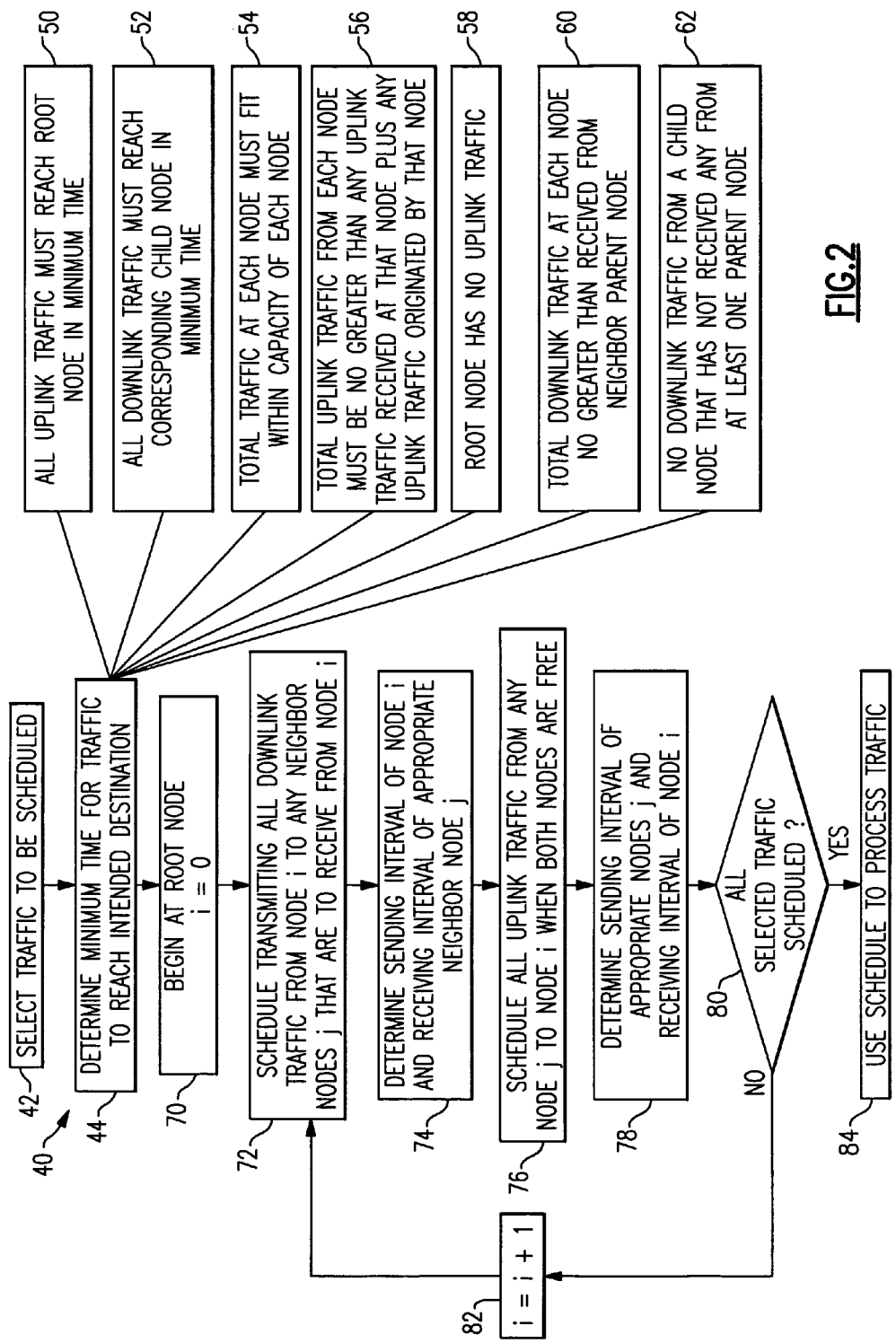
FIG. 2 is a flowchart diagram summarizing one example approach.

An example scheduling technique provides a bandwidth allocation scheme for each node within the mesh network 20 such that the traffic under consideration can reach its destination within the scheduling period. Usually, a longer scheduling period corresponds to lower bandwidth efficiency. Accordingly, an example implementation of this invention minimizes the scheduling period. FIG. 2 includes a flowchart diagram 40 summarizing one example approach for allocating bandwidth within the mesh network 20. This example approach provides scheduling of a given amount of traffic within the network.

The following notations are useful for discussion purposes. Consider, for example, an access tree T=(V, E), where the nodes V are access points, the links E are bidirectional wireless links between neighboring pairs of access points and |V|=N. All nodes in V are labeled with an integer i and the root node is labeled with 0. The root node 0 is a base station in one example, and the other nodes i ∈ V−{0} are subscriber stations Each node i ∈ V has a specified capacity P which is the data rate that it can support.

$F_i$, $F_i = \{j | (j,i) \in E\}$, are the neighboring parent nodes of node i. In the access tree T, each node has at most one neighboring parent node; that is, $|F_i|=1$.

$N_i = \{j | (i,j) \in E\}$ are the neighboring children of node i. Each $j \in N_i$ is given a label l, $l=1 \ldots |N_i|$, and $N_i^l$ is the lth neighboring child of node i. $N_i^l$ and all its children form the lth branch of node I which is donated as $B_i^l$.

C(i) represents all the children of node i, and $$C(i) = \bigcup_{l=1}^{|N_i|} B_i^l.$$

h(i) is the number of hops from the root node O to a node i.
$d_i$ is the uplink traffic request of node i and $d_{0i}$ is the downlink traffic from the root node 0 to node i.

With all the inputs to the scheduling problem, one example includes deciding the uplink and downlink traffic of node i in frame k. Set $x_{i,k}$ as the uplink traffic of node i in frame k, and $y_{i,k}^l$ as the downlink traffic of node i to branch l at frame k.

Referring to FIG. 2, once the tree structure has been established a selected amount of traffic will be scheduled. The determination regarding what traffic will be scheduled is schematically shown in FIG. 2 at 42. The scheduling technique of one example uses a linear program approach having an objective of minimizing the amount of time used for getting the traffic to its intended destination. By minimizing the amount of time for the traffic to reach its intended destination, the most efficient bandwidth allocation is possible.

The linear program approach of one example includes a plurality of constraints associated with the objective of minimizing the time required for the traffic to reach its intended destination. As schematically shown in FIG. 2, at 44, the determination is made regarding the minimum amount of time for the traffic to reach its intended destination. A plurality of constraints are shown, which are part of the linear program approach of this example.

A first constraint is shown at 50, which requires that all uplink traffic must reach the root node (e.g., the node 22 in FIG. 1) after h(i) hops and within the minimum time. If we use K to represent the number of frame slots used to carry all of the selected traffic to its destination and the example linear program approach is intended to minimize K, the following equation represents one expression of the constraint shown at 50.

$$x_{i,k}=0, k \geq K+2-h(i), i=1,\ldots,N.$$

All uplink traffic should be sent before the K+2−h(i) frame to guarantee that such traffic will reach the root node (e.g., the node 22 in FIG. 1) before the frame K (e.g., the end of the minimum time).

In the case of a child node of a node i, at least one additional hop from node i will be required. The constraint at 50 thus requires transmission by the K+1−h(i) frame. This can be represented by the following equation:

$$\sum_{k=1}^{k+1-h(i)} xi,k = di + \sum_{j \in C(i)} dj, i = 1, \ldots, N.$$

Another constraint is shown at 52, which requires that all downlink traffic must reach the corresponding child node within the minimum time K. This constraint can be represented by the following equation:

$$\sum_{k=1}^{K} y_{Fik-1}^{l} = d0i + \sum_{j \in C(i)} d0j$$

$$i = 1, \ldots, N. i = N_{Fi,1}^{l} = 1 \ldots |N_{Fi}|.$$

Another constraint is shown at 54 which requires that the total traffic at each node within the mesh network fit within the capacity of each node, respectively. This is shown by the following relationship:

$$\chi i,k + \sum_{l=1}^{|Ni|} y_{i,k}^{l} + y_{Fi,k}^{k} + \sum_{l=1}^{|Ni|} \chi N_i^1, k \le p$$

$$i = 0, \ldots, N, i = N_{Fi}^{l}, l = 1, \ldots, |N_i|$$

Another constraint is shown in FIG. 2 at 56. This constraint requires that the total uplink traffic from each child node be no greater than any uplink traffic received by that child node plus any uplink traffic originated by that node. This can be represented by the following equation:

$$\sum_{t=1}^{k} \chi i,t - \sum_{t=1}^{k-1} \sum_{l=1}^{|Ni|} \chi N_i^1, t \le di$$

$$k = 2, \ldots, K, i = 1, \ldots, N$$

For the root node (e.g., the node 22 in FIG. 1), there is no uplink traffic because it has no parent node. Accordingly, $X_0$, k=0, k=1 . . . K. This constraint is shown at 58. Another example constraint shown at 60 requires that the downlink traffic sent by each node within the minimum time will not be more than what it has received form its neighboring parent node. This can be represented by the following equation:

$$\sum_{t=1}^{k} \sum_{l=1}^{|Ni|} y_{i,t}^{l} \le \sum_{T=1}^{k-1} y_{Fi,t}^{1}$$

$$k = 2, \ldots, K, i = 1, \ldots, N, i = N_{Fi}^{i}$$

For any subscriber station node (e.g., nodes 24-38), i≠0, there will be no downlink traffic unless the subscriber station node has received some traffic from at least one of its parent nodes. This is shown at 62 and can be represented by the following equation:

$$y_{i,k}^{l} = 0, k \le h(i)$$

$$i=1, \ldots, N. l=1, \ldots, |N_i|$$

Given this description, those skilled in the art will be able to select a known or commercially available tool to solve the example linear program formulation of the example scheduling technique. The solution provides uplink traffic and downlink traffic of each node in each frame k within the minimum time K. Such a solution does not necessarily specify how to arrange the uplink traffic and downlink traffic during each of the P mini-slots of each frame slot so that no interference occurs. One example includes an algorithm for allocating the traffic of each node to particular mini-slots to avoid interference. In this example, $Z_{ik}^{t}$ represents the $t^{th}$ mini-slot of node i at frame slot k. $Z_{ik}^{t}$=NULL in this example means that node i is free in the mini-slot t in the k frame slot. The $Z_{ik}^{t}$=r(j) in this example represents that node i is sending traffic to node j in mini-slot k. The $Z_{ik}^{t}$=s(j) in this example represents that node i receives traffic from node j in the mini-slot k.

In one example, a time slot allocation algorithm includes inputs G=(V,E), $x_{i,k}$, $y_{i,k}$, P, i∈V, and k=1, . . . , K. The mini slot assignment output is $z_{i,k}^{t}$, t=1, . . . , P for each i,k.

At the beginning of the allocation, all K frame slots of each link are free. An example initialization process can be described as follows:

For each k, k=1, . . . , K, get xi, k, $y_{i,k}^{1}$ i∈V,l=1, . . . , |Ni|.$z_{i,k}^{t}$=NULL, ∀t≤P.

Ti={t|$z_{i,k}^{t}$=NULL,t=1, . . . , P}

The example of FIG. 2 includes a step at 70 where the allocation process begins at the root node. Using the notations from above, one example includes the following settings:

i:=0, V₀:=V, l=1

When the selected node i has downlink traffic, some of the free mini slots are selected for transmitting the downlink traffic from the node i to a neighbor node j. This is shown at 72 in FIG. 2. As shown at 74, the sending interval of the node i and the receiving interval for the corresponding node j are determined. In the example of FIG. 1, the downlink neighbors of node i are served according to the sequence from left to right in the drawing. One way of implementing the steps at 72 and 74 in FIG. 2 can be expressed using the following notation:

Select t∈ Ti, if $y_{i,k}^{l}$>0, $z_{i,k}^{t}$=s($N_i^l$),$y_{i,k}^{l}$=$y_{i,k}^{l}$−1,Ti:=Ti−{t}, j=$N_i^l$, $z_{j,k}^{t}$=r(i), Tj−{t}.

If $y_{i,k}^{l}$>0, go to step at 72, otherwise l++, if l≤|Ni|, go to step at 72.

The next step in the example of FIG. 2 is shown at 76 where a neighbor node j of node i is selected and if it has uplink traffic, free mini slots that are common to nodes i and j are selected for sending such uplink traffic. As shown at 78, the sending interval of the node j and the receiving interval for the node i are determined. The steps at 76 and 78 are repeated for all neighbor nodes j of the node i (taken in sequence from left to right in the example of FIG. 1, for example). In one example, the steps shown at 76 and 78 can be described using the following:

For j=$N_i^l$, l=1, . . . , |Ni|, t ∈Ti∩Tj if xj,k>0,$z_{j,k}^{t}$=s(i),$z_{i,k}^{t}$=r(j),xj,k=xj,k−1,

Tj=Tj−{t}, Ti=Ti−{t}, go to step at 76.

In the example of FIG. 2, a determination is made at 80 whether all the selected traffic has been scheduled. If not, the next node is considered at 82 and the steps from 74 to 78 are completed for that node. This process continues for each node whose time slots have not been allocated. Selecting a node whose time slots have not been allocated in one example can be described using the following:

$V_0 := V - \{i\}$. If $V_0 \neq$ NULL, select $i \in V0$, and $Fi \notin V0$, set $l=1$, go to step at 72.

Once the mini slot allocation is completed, that schedule is used at 84 for processing the traffic in the mesh network.

Using the example scheduling technique provides the ability to significantly reduce the time required for handling a given amount of traffic. One example use of the disclosed example is for centralized scheduling in a Wimax network that is based on the IEEE 802.16 standard. In such an example, the constraints (e.g., those shown at 50-62 in FIG. 2) are specified according to the features of TDD mode in the Wimax network. Given this description, those skilled in the art will be able to apply the above teachings to a particular network with which they are working and to design appropriate constraints to meet their particular needs.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of communicating in a mesh network having a root node and a plurality of child nodes associated with the root node, comprising:

scheduling a selected amount of traffic in the mesh network using a linear program that minimizes a time for the selected amount of traffic to reach its intended destination subject to a plurality of constraints that ensure that the selected amount of traffic will reach its intended destination within the minimized time, wherein the plurality of constraints comprises a constraint requiring that all transmissions from at least one of the plurality of child nodes to the root node will reach the root node within the minimized time, wherein the constraint requires that all uplink traffic via the at least one child node must be transmitted to the at least one child node from an originating child node of the at least one child node before the $(K+1-h)$th frame, where K is the total number of frames in the minimized time and h is the number of hops between the at least one child node and the root node; and transmitting the selected amount of traffic.

2. The method of claim 1, wherein the minimized time comprises a plurality of frames within which the selected amount of traffic will be transmitted between at least two of the nodes for the traffic to reach its intended destination.

3. The method of claim 1, wherein the number of hops corresponds to a number of nodes between the at least one child node and the root node through which the root node and the at least one child node communicate with each other.

4. The method of claim 1, wherein the constraint requires that all uplink traffic from the at least one child node to the root node be transmitted before the $(K \div 2 - h)$th frame, where K is the total number of frames in the minimized time and h is the number of hops between the at least one child node and the root node.

5. The method of claim 1, wherein the plurality of constraints comprises a constraint requiring that all transmissions from the root node to the at least one child node reach the at least one child node within the minimized time.

6. The method of claim 1, wherein the plurality of constraints comprises a constraint requiring that a total amount of traffic to and from each of the nodes does not exceed a corresponding capacity of each of the nodes.

7. The method of claim 1, wherein the plurality of constraints comprises a constraint requiring that the total uplink traffic transmitted by each of the plurality of child nodes during the minimized time is no greater than any uplink traffic received by one of the child nodes from any other of the plurality of child nodes during the minimized time and any uplink traffic originated by the one child node during the minimized time.

8. The method of claim 1, wherein the plurality of constraints comprises a constraint that requires that a total downlink traffic at each of the child nodes during the minimized time be no greater than any downlink traffic received by each child node from a neighbor parent node.

9. The method of claim 1, wherein the plurality of constraints comprises a constraint that requires that a child node that has not received any downlink traffic from at least one parent node transmits no downlink traffic during the minimum time.

10. The method of claim 1, wherein the plurality of constraints comprises a constraint that requires that the root node has no uplink traffic.

11. The method of claim 1, comprising allocating a plurality of mini slots within the minimized time to each of the nodes to accommodate the selected amount of traffic within the minimized time including scheduling all downlink transmissions from a first one of the nodes to any neighbor child node and determining a corresponding sending interval of the first one of the nodes and a receiving interval of any corresponding neighbor child node.

12. The method of claim 11, comprising scheduling all uplink transmissions from any neighbor child node to the first one of the nodes and determining a corresponding sending interval for the any neighbor child node and a receiving interval of the first one of the nodes.

13. The method of claim 12, comprising repeating the steps of scheduling the downlink transmissions and scheduling the uplink transmissions sequentially for each of the nodes within the mesh network until all of the selected traffic has been scheduled.

14. A method of communicating in a mesh network having a root node and a plurality of child nodes associated with the root node, comprising:

scheduling a selected amount of traffic in the mesh network using a linear program that minimizes a time for the selected amount of traffic to reach its intended destination subject to a plurality of constraints that ensure that the selected amount of traffic will reach its intended destination within the minimized time, wherein the plurality of constraints comprises a first constraint requiring that all transmissions from at least one of the plurality of child nodes to the root node will reach the root node within the minimized time, wherein the first constraint requires that all uplink traffic via the at least one child node must be transmitted to the at least one child node from an originating child node of the at least one child node before the (K+1−h)th frame, where K is the total number of frames in the minimized time and h is the number of hops between the at least one child node and the root node;

a second constraint requiring that all transmissions from the root node to the at least one child node reach the at least one child node within the minimized time;

a third constraint requiring that a total amount of traffic to and from each of the nodes does not exceed a corresponding capacity of each of the nodes;

a fourth constraint requiring that the total uplink traffic transmitted by each of the plurality of child nodes during the minimized time is no greater than any uplink traffic received by one of the child nodes from any other of the plurality of child nodes during the minimized time and any uplink traffic originated by the one child node during the minimized time;

a fifth constraint that requires that a total downlink traffic at each of the child nodes during the minimized time be no greater than any downlink traffic received by each child node from a neighbor parent node;

a sixth constraint that requires that a child node that has not received any downlink traffic from at least one parent node transmits no downlink traffic during the minimum time; and transmitting the selected amount of traffic.

15. The method of claim 14, wherein the plurality of constraints comprises a seventh constraint that requires that the root node has no uplink traffic.

16. The method of claim 14, wherein the number of hops corresponds to a number of nodes between the at least one child node and the root node through which the root node and the at least one child node communicate with each other.

17. The method of claim 14, wherein the first constraint requires that all uplink traffic from the at least one child node to the root node be transmitted before the (K+2−h)th frame, where K is the total number of frames in the minimized time and h is the number of hops between the at least one child node and the root node.

* * * * *